Sept. 6, 1927.

J. S. BARNETT 1,641,656

PLANETARY TRANSMISSION GEARING

Filed May 29, 1923

INVENTOR.
J. S. BARNETT
BY Joseph B. Gardner
his ATTORNEY

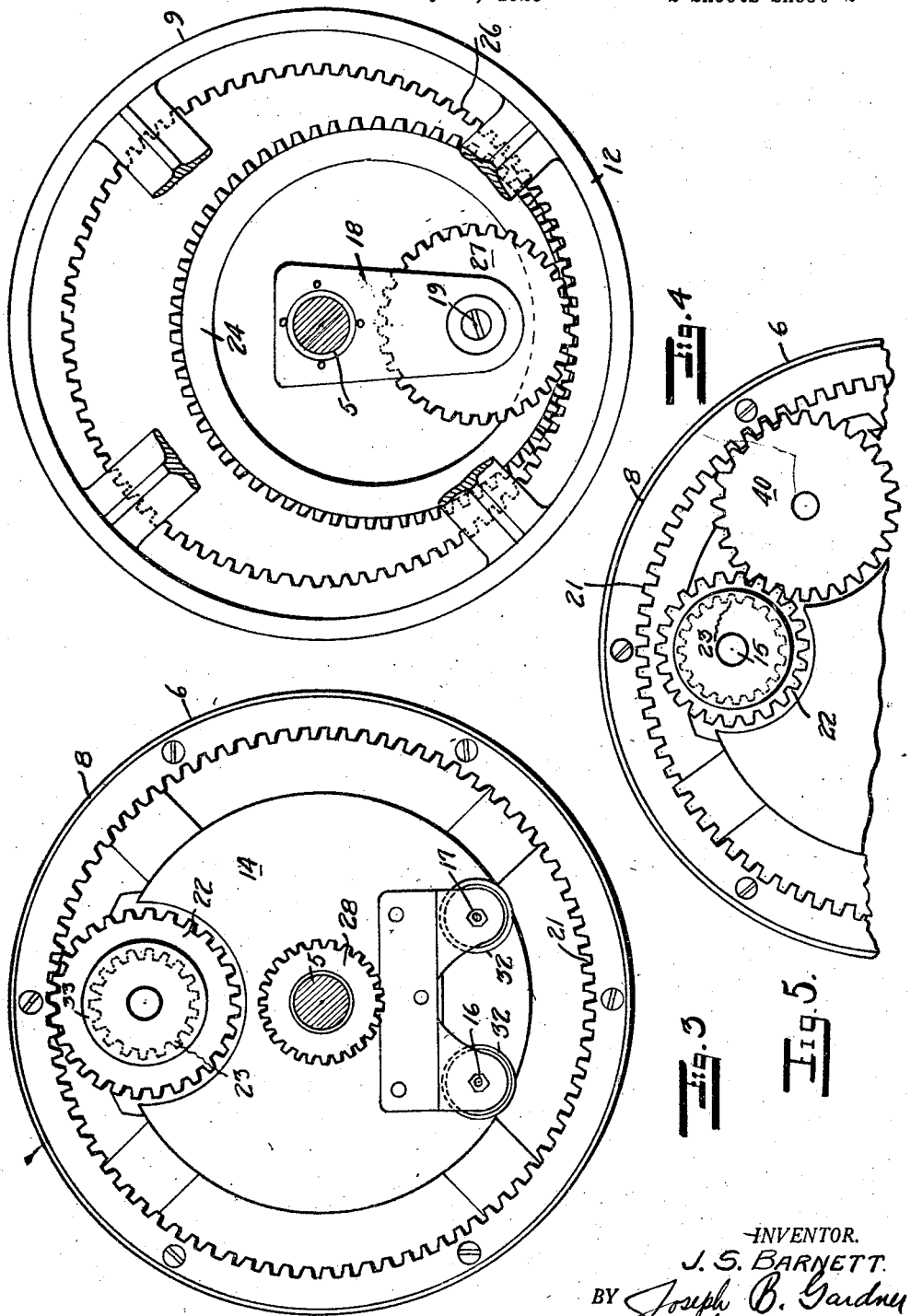

Patented Sept. 6, 1927.

1,641,656

UNITED STATES PATENT OFFICE.

JOHN S. BARNETT, OF OAKLAND, CALIFORNIA.

PLANETARY TRANSMISSION GEARING.

Application filed May 29, 1923. Serial No. 642,174.

My invention relates to a planetary gearing mechanism for power transmission, and particularly to the type wherein the drive and driven members are coaxially mounted.

An object of my invention is to provide a planetary gearing mechanism for the transmission of power between coaxially mounted power members which is highly efficient, simple and compact.

Another object of my invention is to provide a device of the character described which provides means whereby the direction of rotation and the relative speed of the power members may differ.

A further object of my invention is to provide a device of the character described which may be used reversibly.

A still further object of my invention is to provide a device of the character described which may be adapted for use as a gear or chain hoist.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 3 is a view of the portion of my device taken behind the broken line 3—3 in Figure 2.

Figure 4 is a view of the portion of my device lying between the lines 4—4 and 3—3 in Figure 2.

Figure 5 is a fragmentary view similar to Figure 3 showing a slightly modified form of the invention.

Figure 2:
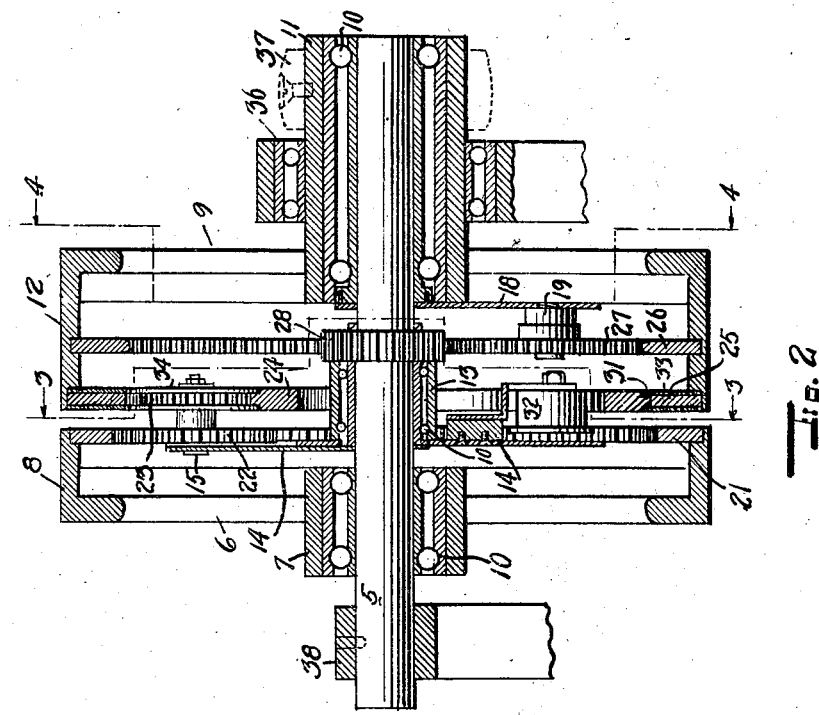
Figure 2 is a longitudinal section taken on the line 2—2 in Figure 1.
Figure 1:
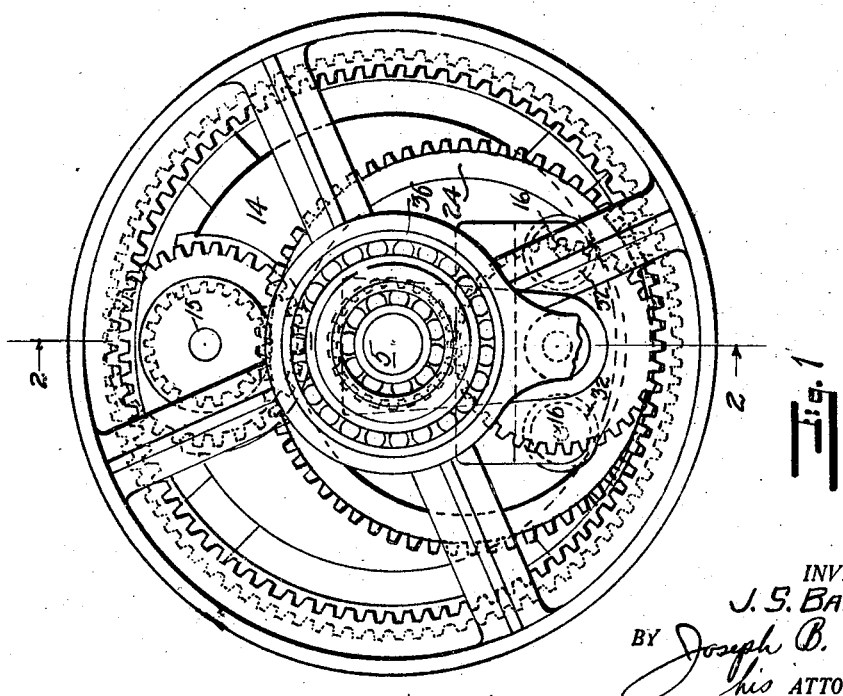
Figure 1 is an end view of the mechanism of my invention.

Briefly expressed, the power transmission means of my invention as here shown comprises a shaft and coaxially mounted drive and driven members associated therewith which are operatively connected to each other and to the shaft by a novel gearing arrangement. The said gearing includes a planetary gear mounted on a disk which is revoluble about the shaft, and a floating ring gear associated with said planetary gear. The device is preferably so constructed that if any one of said members or shaft is held fixed, rotation of one of the others will produce rotation of the third relative to the other two.

A detailed description follows:

In the present embodiment of my invention a power wheel 6 having a hub 7 and rim 8 is mounted for rotation about a shaft 5. Mounted adjacent said power wheel for rotation about said shaft is a driven wheel 9 having a hub 11 and rim 12 somewhat similar to the wheel 6. A hub 13 carrying a disk 14 is mounted for rotation about said shaft between the hubs 7 and 9 which are spaced to allow interposition of the hub 13. Suitable antifriction bearings 10 are preferably arranged in the different hubs. Mounted on the disk 14 are stub shafts 15, 16 and 17 disposed parallel to said shaft 5. Fixed to said shaft 5 adjacent the inner end of the hub 11 is an arm 18 carrying thereon a stub shaft 19 arranged parallel to the shaft 5.

Fixed to the rim 8 is an internal gear 21 which is concentric with the shaft 5 and which meshes with a planetary gear 22 mounted for rotation about the stub shaft 15. A pinion 23 is also mounted for rotation about the stub shaft 15 and is connected with the gear 22 for rotation therewith. The gear 23 is positioned in the plane of an internal gear 25 which is fixed to the wheel rim 12 and is concentric with the shaft 5. Mounted between the pinion and the internal gear 25 is a ring gear 24 adapted to mesh with the pinion and internal gear at diametrically opposite points of the ring gear. Secured to the rim 12 is a second internal gear 26 which engages a pinion 27 mounted for rotation about the stub shaft 19, the pinion 27 in turn engaging a gear 28 fixed to the hub 13. It will thus be seen that the power is transmitted from the wheel 6 to the wheel 9 by means of the gears and pinions 21, 22, 23, 24 and 25 in order, and that the gears and pinions 26, 27 and 28 combine to provide a fixed point about which the system operates. The ring gear is held contactually positioned with respect to the internal gear 25 by means of rollers 32 engaging the inner circumference thereof and mounted on the stub shaft 16 and 17. The ring gear, by reason of the rollers and the gears engaging it, rotates constantly about the same axis, hence the rollers 32 may be variously placed to provide the necessary contact. However, it has been found that placing these rollers symmetrically disposed with respect to the opposite points of engagement of the ring gear, and with their line of centers slightly closer to the teeth of the internal gear 25 than to the teeth of the pinion 24 at the points of engagement, results in a minimum of friction between the parts involved and thus increases the efficiency of the entire device.

Formed in the ring gear 24 are annular shoulders 31 which are arranged to circumferentially engage annular flanges 33 and 34 arranged on opposite sides of the gears 25 and 23 respectively. In this manner the ring gear is held against longitudinal and transverse displacement and the gears held in proper relative positions, thereby preventing any binding. The teeth of the ring gear are preferably formed slightly narrower than the space between the flanges, thus minimizing the side friction between said members.

By mounting the hub 11 in a bearing 36 a belt pulley 37 may be attached to the outer end of said hub as shown. However, it is readily seen that the shaft may itself be mounted in a bearing or mounting to produce the same result. As here shown, the end of the shaft adjacent the hub 7 is fixed in a mounting 38, said bearing and mounting together supporting the device in any desired position. It will also be evident that one or both of the rims may be adapted for use as pulleys or may be otherwise adapted for driving connections.

By fixing either one of members 8 or 12 against rotation and allowing the shaft to rotate, it will be evident that power may be transmitted between the free member and the shaft. It is also to be noted that the mechanical advanage of the device may be varied by appropriately varying the diameters of the various gears in the system. Reversal of the direction of rotation of the driven wheel relative to the power wheel may be readily effected by mounting an idler pinion 40 on the disk 14 and interposed between and engaging the internal gear 21 and the planetary gear 22, which are separated to eliminate direct contact between them.

It will be clear from the construction here shown that the device is reversible in action, thereby making it particularly applicable for use in conection with reversible machines or as a gear chain hoist.

I claim:

1. A planetary transmission gearing comprising a fixed shaft, an internal gear mounted for rotation about said shaft, a pair of relatively fixed internal gears adjacent said first gear and mounted for rotation about said shaft, a ring gear engaging one of said latter gears, a supporting element rotatably mounted on said shaft, a pair of relatively fixed planetary gears rotatably carried by said supporting element and engaging said first internal gear and said ring gear, and driving connections between the other of said pair of internal gears and said shaft.

2. A planetary transmission gearing comprising a fixed shaft, an internal gear mounted for rotation about said shaft, a pair of relatively fixed internal gears adjacent said first gear and mounted for rotation about said shaft, a ring gear engaging one of said latter gears, a supporting element rotatably mounted on said shaft, a pair of relatively fixed planetary gears rotatably carried by said supporting element and engaging said first internal gear and said ring gear, a supporting element fixed to said shaft, a pinion carried on said latter supporting element and meshing with one of said pair of internal gears, and a gear coaxially fixed to said first supporting element and meshing with said latter pinion.

3. A planetary transmission gearing comprising a fixed shaft, a rotatable member mounted for rotation about said shaft and provided with an internal gear, a planetary pinion mounted for movement about said shaft and arranged to be driven by said internal gear, a second rotatable member mounted for rotation about said shaft adjacent said first rotatable member and provided with an internal gear, a ring gear eccentrically mounted in alignment with and for engagement between said pinion and said second internal gear, annular flanges coaxially mounted on said pinion and on said second internal gear and engaging annular shoulders provided on said ring gear, a roller arranged to continuously engage the inner circumference of said ring gear, and gear means operatively connecting said second rotatable member with said shaft.

4. A planetary transmission gearing comprising a fixed shaft, a rotatable member mounted for rotation about said shaft and provided with an internal gear, a second rotatable member mounted for rotation about said shaft adjacent said first rotatable member and provided with an internal gear, a hub mounted for rotation about said shaft between said rotatable members, a supporting element mounted on said hub for rotation therewith, a planetary pinion rotatably carried by said element and engaging said first internal gear, a second pinion coaxially mounted for rotation with said first pinion, a ring gear eccentrically mounted in alignment with and engagement between said second pinion and the internal gear of the second rotatable member, means associated with said second internal gear and with said second pinion for holding the ring gear aligned therewith and properly positioned with respect thereto, a second internal gear mounted on said second rotatable member, an arm fixed to and extending transversely from said shaft, a gear concentrically mounted on said hub adjacent said arm, and a pinion fixed to said arm and engaging between said second internal gear of said second member and said last mentioned pinion.

5. A planetary transmission gearing comprising a fixed shaft, a rotatable member mounted for rotation about said shaft and provided with an internal gear, a second rotatable member mounted for rotation about said shaft adjacent said first rotatable member and provided with an internal gear, a hub mounted for rotation about said shaft between said rotatable members, a supporting element mounted on said hub for rotation therewith, a planetary pinion rotatably carried by said element and engaging said first internal gear, a second pinion coaxially mounted for rotation with said first pinion, a ring gear eccentrically mounted in alignment with and engagement between said second pinion and the internal gear of the second rotatable member, annular shoulders arranged on said ring gear, annular flanges mounted on said second pinion and on the internal gear of the second rotatable member engaging said annular shoulders, a roller engaging the inner circumference of said ring gear, and gear means operatively connecting said second rotatable member with said hub.

6. A transmission gearing comprising a shaft, a pair of gears mounted for rotation about said shaft, a supporting element independently mounted on said shaft for rotation thereabout, a planetary gear mounted for rotation on said element and engaging one of said gears, a ring gear operatively connected with said planetary gear and the other of said pair, and means carried by said element and shaft operatively connecting one of said gears to said shaft for rotation about said shaft.

7. In a gearing, a shaft, a drive gear mounted for rotation about and with respect to said shaft, a driven gear mounted for rotation about and with respect to said shaft, an independently mounted planetary gear arranged to maintain operative engagement with one of said first gears, and driving connections between said planetary gear and the other of said first gears.

8. A gearing comprising a shaft providing the sole support therefor, a pair of internal gears independently mounted for rotation about said shaft, a supporting element rotatably mounted on said shaft, a pair of relatively fixed planetary gears rotatably carried by said supporting element, one of said planetary gears being operatively engaged with an internal gear, and means operatively connecting the other of said planetary gears with said shaft and the other of said internal gears.

9. A gearing comprising a shaft, a member provided with an internal gear mounted for coaxial rotation about said shaft, a second member provided with a pair of relatively fixed internal gears mounted for coaxial rotation about said shaft, gear means operatively connecting the internal gear of said first member with one of the internal gears of said second member, and gear means operatively connecting the other internal gear of said second member with said shaft.

10. A gearing comprising a shaft, a member provided with an internal gear and mounted for rotation about said shaft, a second member provided with a pair of relatively fixed internal gears mounted for rotation about said shaft, gear means operatively connecting the internal gear of said first member with one of the internal gears of said second member, and a gear mounted in fixed and eccentric relation to said shaft arranged to operatively connect the second internal gear of said second member and said shaft.

11. A gearing comprising a shaft, a member provided with an internal gear arranged for coaxial rotation about said shaft, a second member provided with a pair of relatively fixed internal gears arranged for coaxial rotation about said shaft, means including a planetary gear independently mounted for rotation about said shaft operatively connecting the internal gear of said first member with one of the internal gears of said second member, and a gear fixedly carried on said shaft in eccentric relation thereto and arranged to operatively connect the second internal gear of said second member and said shaft.

In testimony whereof, I have hereunto set my hand at Oakland, this 5th day of May, 1923.

JOHN S. BARNETT.